(12) United States Patent
Stubenberger

(10) Patent No.: US 12,397,663 B2
(45) Date of Patent: Aug. 26, 2025

(54) CHARGING FLAP SYSTEM AND MOTOR VEHICLE

(71) Applicant: Bayerische Motoren Werke Aktiengesellschaft, Munich (DE)

(72) Inventor: Andreas Stubenberger, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 511 days.

(21) Appl. No.: 17/774,621

(22) PCT Filed: Oct. 5, 2020

(86) PCT No.: PCT/EP2020/077884
§ 371 (c)(1),
(2) Date: May 5, 2022

(87) PCT Pub. No.: WO2021/089260
PCT Pub. Date: May 14, 2021

(65) Prior Publication Data
US 2022/0396160 A1 Dec. 15, 2022

(30) Foreign Application Priority Data
Nov. 6, 2019 (DE) ..................... 10 2019 129 898.9

(51) Int. Cl.
*B60L 53/16* (2019.01)
(52) U.S. Cl.
CPC .................................... *B60L 53/16* (2019.02)
(58) Field of Classification Search
CPC . B60L 53/16; B60K 15/05; B60K 2015/0515; B60K 2015/053; Y02T 90/14
See application file for complete search history.

(56) References Cited

U.S. PATENT DOCUMENTS 5,501,607 A * 3/1996 Yoshioka .............. E05D 11/105
220/259.2
5,580,258 A 12/1996 Wakata
(Continued)

FOREIGN PATENT DOCUMENTS

CN 202081785 U 12/2011
CN 103081246 A 5/2013
(Continued)

OTHER PUBLICATIONS

English translation of Chinese Office Action issued in Chinese Application No. 202080073350.4 dated May 29, 2023 (6 pages).
(Continued)

*Primary Examiner* — Vanessa Girardi
(74) *Attorney, Agent, or Firm* — Crowell & Moring LLP

(57) ABSTRACT

A charging flap system for a motor vehicle that is at least partially operated electrically has a charging connection, which is arranged in a charging well, for electrically charging the motor vehicle, in particular a battery of the motor vehicle, a pivotable, outer covering flap which covers the charging well in a closed position and opens up same in an open position, and a pivotable, inner charging flap which opens up the charging connection in a charging position. The inner charging flap and the outer covering flap interact in such a manner that the outer covering flap and the inner charging flap are coupled to each other in a form-fitting manner in an intermediate position between the open position and the closed position.

19 Claims, 1 Drawing Sheet

(56) References Cited

U.S. PATENT DOCUMENTS

| | | |
|---|---|---|
| 9,515,418 B2 | 12/2016 | Yoshizawa et al. |
| 11,299,039 B2 * | 4/2022 | Schwab ................ B60K 15/05 |
| 2013/0196522 A1 | 8/2013 | Hara |
| 2013/0271079 A1 | 10/2013 | Tanneberger et al. |
| 2017/0368928 A1 | 12/2017 | Mori et al. |
| 2018/0215254 A1 | 8/2018 | Jobst et al. |

FOREIGN PATENT DOCUMENTS

| | | |
|---|---|---|
| CN | 103237678 A | 8/2013 |
| CN | 107521336 A | 12/2017 |
| CN | 108357568 A | 8/2018 |
| CN | 207920316 U | 9/2018 |
| CN | 207988897 U | 10/2018 |
| DE | 299 04 804 U1 | 8/2000 |
| DE | 11 2011 103 303 T5 | 8/2013 |
| DE | 10 2017 201 365 A1 | 8/2018 |
| DE | 10 2017 222 061 A1 | 1/2019 |
| DE | 10 2018 103 731 A1 | 8/2019 |
| JP | 2009-27851 A | 2/2009 |

OTHER PUBLICATIONS

English translation of Chinese Office Action issued in Chinese Application No. 202080073350.4 dated Nov. 21, 2023 (6 pages).

International Search Report (PCT/ISA/210) issued in PCT Application No. PCT/EP2020/077884 dated Nov. 19, 2020 with English translation (five (5) pages).

German-language Written Opinion (PCT/ISA/237) issued in PCT Application No. PCT/EP2020/077884 dated Nov. 19, 2020 (five (5) pages).

German-language Search Report issued in German Application No. 10 2019 129 898.9 dated Jul. 31, 2020 with partial English translation (12 pages).

* cited by examiner

CHARGING FLAP SYSTEM AND MOTOR VEHICLE

BACKGROUND AND SUMMARY

The invention relates to a charging flap system for an at least partially electrically operated motor vehicle, and to a motor vehicle.

Charging flap systems for at least partially electrically operated vehicles are known from the prior art. A charging connector is received in a charging well which, in the motor vehicle, is disposed behind an access opening in a corresponding vehicle body component. In order for the access opening to be closed, an outer covering flap which, by way of a hinge arm, is adjustable between an opened and a closed position is usually provided.

If the covering flap is open over a comparatively long period of time, as is the case in particular in partially electrically operated vehicles when the latter are being charged outdoors over a comparatively long period of time, snow caused by the weather can enter the opened system, the snow completely filling the charging well, which subsequently may lead to icing. The hinge arm may be blocked as a result, such that the covering flap can no longer be closed. The consequence is that the snow, or the ice, respectively, has to be tediously removed, which compromises comfort and costs time.

It is therefore an object of the invention to provide a charging flap system in which the covering flap can be reliably closed independently of the weather conditions.

This object is achieved according to the invention by a charging flap system for an at least partially electrically operated motor vehicle having a charging connector for electrically charging the motor vehicle, in particular a battery of the motor vehicle, disposed in a charging well. The charging flap system furthermore has a pivotable, outer covering flap which, in a closed position, covers and, in an open position, uncovers the charging well, and a pivotable inner charging flap which, in a charging position, uncovers the charging connector. The inner charging flap and the outer covering flap here interact such that the outer covering flap and the inner charging flap in an intermediate position between the open position and the closed position are coupled to one another in a form-fitting manner. In the intermediate position, the charging well is partially covered by the outer covering flap. The invasion of solid or liquid substances from the outside can be minimized as a result thereof. Because the outer covering flap in the intermediate position is set at an angle and does not project so far from the vehicle as in the open position, the risk of persons, for example pedestrians, colliding with the opened covering can be reduced.

When closing the outer covering flap, the pressure applied causes the form-fitting coupling, the latter being in particular in the form of the two flaps latching or jamming together.

The form-fitting coupling is preferably established by a releasable tongue-and-groove connection, wherein the outer covering flap provides the tongue and the inner charging flap provides the groove, or vice versa.

In one embodiment, the outer covering flap is assigned a receptacle region, in particular a receptacle cavity, in which at least part of the inner charging flap can be received. This enables the coupling of the two flaps.

The receptacle is in particular understood to be the inner charging flap latching or jamming in the receptacle region of the outer covering flap.

Optionally, a receptacle region can be provided on the inner flap and an appendage can be provided on the outer covering flap, the appendage penetrating the receptacle region of the inner flap when the two flaps are coupled.

A further embodiment provides that the outer covering flap comprises a hinge arm by way of which the outer covering flap is attached to the vehicle, wherein the hinge arm has a receptacle region, in particular a receptacle concavity, in which at least part of the inner charging flap can be received. This enables the coupling of the two flaps.

Optionally, the hinge arm can serve as a gate guide on which the inner charging flap slides along toward the receptacle region when the outer covering flap is being closed.

Alternatively, an appendage can be provided on an end of the hinge arm proximal to the covering flap, and a receptacle region can be provided on the inner charging flap. When the outer covering flap is being closed, the receptacle region of the inner charging flap slides along the hinge arm toward the appendage, the latter then penetrating the receptacle region of the inner charging flap.

According to a further embodiment, a coupling member by way of which the inner charging flap in the intermediate position is coupled in a form-fitting manner to the outer covering flap is provided on the inner charging flap. The inner charging flap can penetrate the receptacle region of the outer covering flap and be mounted, in particular latched or jammed, in a form-fitting manner by way of the coupling member.

The coupling member can be integrally molded on the inner charging flap or, as a separate component, be fastened to the inner charging flap.

The coupling member is preferably a protrusion which is molded on or fastened to the inner charging flap.

The coupling member is in particular provided on a free end of the inner charging flap, in particular wherein the free end in terms of the inner charging flap is opposite the pivot axis of the inner charging flap. The free end comprises the region which when closing and opening the flaps comes into contact with the outer covering flap. It is therefore expedient for the coupling member to be disposed in this region.

The free end is (substantially) the region of the inner charging flap that is the most remote from the pivot axis of the inner charging flap.

The pivot axes of the two flaps preferably lie so as to be mutually parallel and in terms of the charging connector are disposed on the same side. In other words, the pivoting direction of the two flaps when opening and closing is (substantially) identical.

Optionally, a latching cam can be provided on the coupling member. The latching cam guarantees the form-fitting coupling, in particular the form-fitting latching or jamming of the two flaps.

For this purpose, the thickness of the latching cam (and the thickness of the coupling member) can be somewhat greater than the thickness of the receptacle opening of the receptacle region.

The latching cam can interact with a latching well disposed in the receptacle region of the outer covering flap, so as to reinforce the form-fit of the coupling of the two flaps.

One aspect provides that the outer covering flap in the intermediate position is held at an angle of at least 20° to at most 60°, in particular of at least 25° to at most 50°, preferably of at least 30° to at most 40°, in relation to a plane in which the charging connector is disposed, and/or that the inner charging flap in the intermediate position of the outer covering flap is held at an angle of at least 90° to at most 180°, in particular to at most 150°, preferably to at most 120°, in relation to a plane in which the charging connector is disposed. A sufficient angular position of the outer covering flap is thus ensured, as a result of which the invasion of solid or liquid substances from the outside and the risk of people colliding on the outer covering flap can be reduced.

The two angled flaps conjointly form a type of protective housing about a hinge box in which the hinge arm is pivotably received, so that—if at all—only a minor invasion of solid or liquid substances into the hinge box is possible.

According to a further aspect, the form-fitting coupling of the outer covering flap and of the inner charging flap is releasable by a pivoting movement of the outer covering flap in the direction of the open position. The two flaps can thus be decoupled without tools, the latching or jamming thus being in particular cancelled without tools. Thereafter, the inner charging flap and the outer covering flap can be guided, in particular successively, to the respective closing positions thereof.

According to a further aspect, the inner charging flap and/or the outer covering flap are/is preloaded to the respective charging or open position, respectively. In this way both flaps can be opened easily. Moreover, it can be prevented that the outer covering flap is closed without the inner charging flap having been closed beforehand, because the inner charging flap is interlocked with the receptacle region of the outer covering flap.

It can also be provided that the outer covering flap is preloaded in the direction of the closed position thereof. The latching or jamming of the inner charging flap in the receptacle region of the outer covering flap here is not mandatory, because the outer covering flap is actively impinged toward the inner charging flap and the form-fit between the two flaps is thus actively maintained.

The object is furthermore achieved by a motor vehicle having a vehicle body component and the charging flap system according to the invention.

The advantages and properties described of the charging flap system according to the invention apply in analogous manner to the motor vehicle.

Further advantages and properties of the invention are derived from the description hereunder and from the drawings to which reference is made.

DETAILED DESCRIPTION OF THE DRAWINGS

Figure 1:
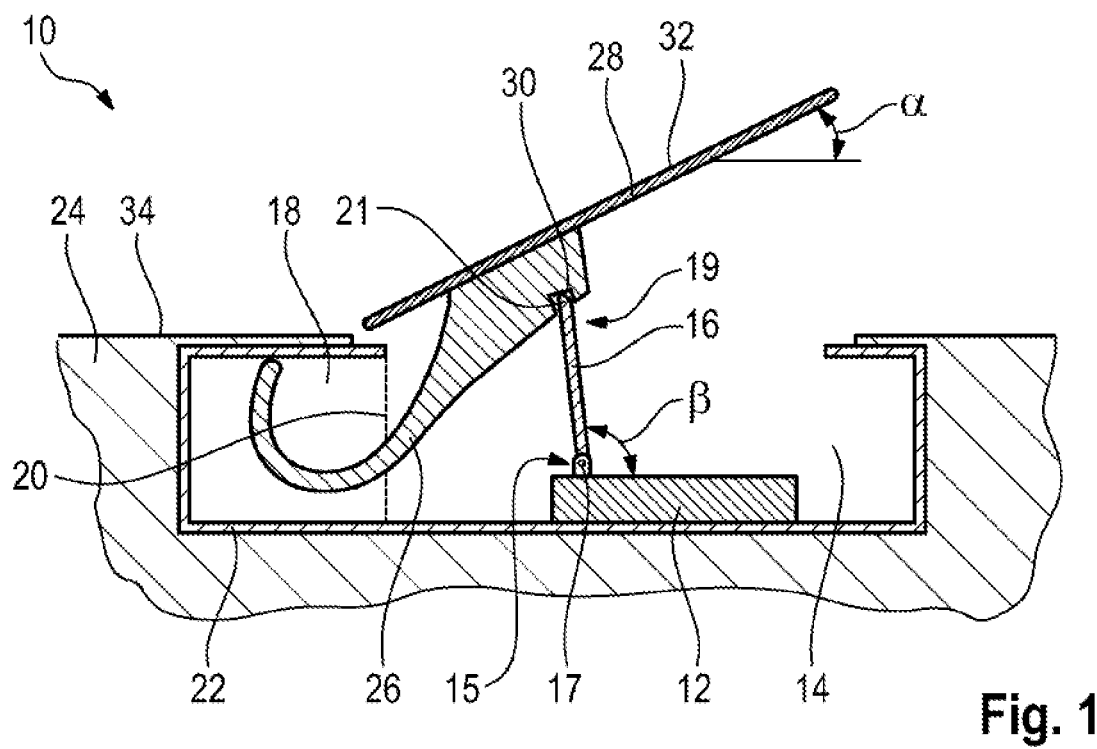
FIG. 1 is a schematic sectional view of a charging flap system according to an embodiment of the invention.

A charging flap system 10 for an at least partially electrically operated motor vehicle is illustrated in a schematic sectional view in FIG. 1. The charging flap system 10 has a charging connector 12 which is disposed in a charging well 14.

An inner charging flap 16 which is pivotable about a pivot axis 17 is attached to the charging connector 12 by way of a fastening end 15.

Optionally, the inner charging flap 16 can also be provided in a region about the charging connector 12.

The inner charging flap 16 has a free end 19 which is (substantially) opposite the fastening end 15. A coupling member 21, which in the embodiment shown is configured as a molded protrusion, is provided on the free end 19.

Optionally, the coupling member 21 can also be configured as a separate component which is fastened to the free end 19 of the inner flap 16.

A hinge box 18 which, by way of a transition opening 20, is connected to the charging well 14 is disposed discretely from the charging well 14.

The charging well 14 and the hinge box 18 are partially enclosed by a housing 22 which is received in a vehicle body 24.

A hinge arm 26 to which an outer covering flap 28 is attached is pivotably mounted in the hinge box 18. The hinge arm 26 on a side that faces away from the outer covering flap 28 has a receptacle region 30 which is configured as a receptacle concavity, for example as a groove or an opening.

In a closed position (not illustrated) of the outer covering flap 28, the charging well 14 is completely covered by the outer covering flap 28. In other words, the housing 22 is closed in the closing position of the outer covering flap 28. An external side 32 of the outer covering flap 28 here terminates so as to be flush with the surface of a body outer skin 34.

An angle α between the outer covering flap 28 and the body outer skin 34 in the closed position is accordingly (approximately) 0°.

The inner charging flap 16 in a closed position (not illustrated) of the inner charging flap 16 bears in a planar manner on an internal housing of the charging connector 12 and hereby completely covers the charging connector 12, or in particular closes the latter in the process.

In the closed position, an angle β between the inner charging flap 16 and a fastening plane in which the inner charging flap 16 is fastened to the charging connector 12 is (approximately) 0°.

In an open position (not illustrated), the outer covering flap 28 is pivoted away from the body outer skin 34, as a result of which the charging well 14 is exposed. In other words, the housing 22 in the open position of the outer covering flap 28 is opened. The outer covering flap 28 here can project from the vehicle body 24 so as to be (approximately) orthogonal.

The angle α between the outer covering flap 28 and the body outer skin 34 in the open position is in a range from 60° to 120°.

The inner charging flap 16 in a charging position (not illustrated) of the inner charging flap 16 is pivoted away from the charging connector 12 and thereby exposes the latter.

In the charging position, the angle β between the inner charging flap 16 and the fastening plane is more than 90°.

In FIG. 1, the outer covering flap 28 is illustrated in an intermediate position in which the outer covering flap 28 is coupled to the inner charging flap 16. The coupling member 21 of the inner charging flap 16 here is received in a form-fitting manner in the receptacle region 30 of the outer covering flap 28 such that the outer covering flap 28 interlocks with the inner charging flap 16.

The angle α in the intermediate position is in a range from at least 20° to at most 60°, in particular from at least 25° to at most 50°, preferably from at least 30° to at most 40°.

The angle β in the intermediate position is in a range from at least 90° to at most 180°, in particular from at least 90° to at most 150°, preferably from at least 90° to at most 120°.

Figure 2:
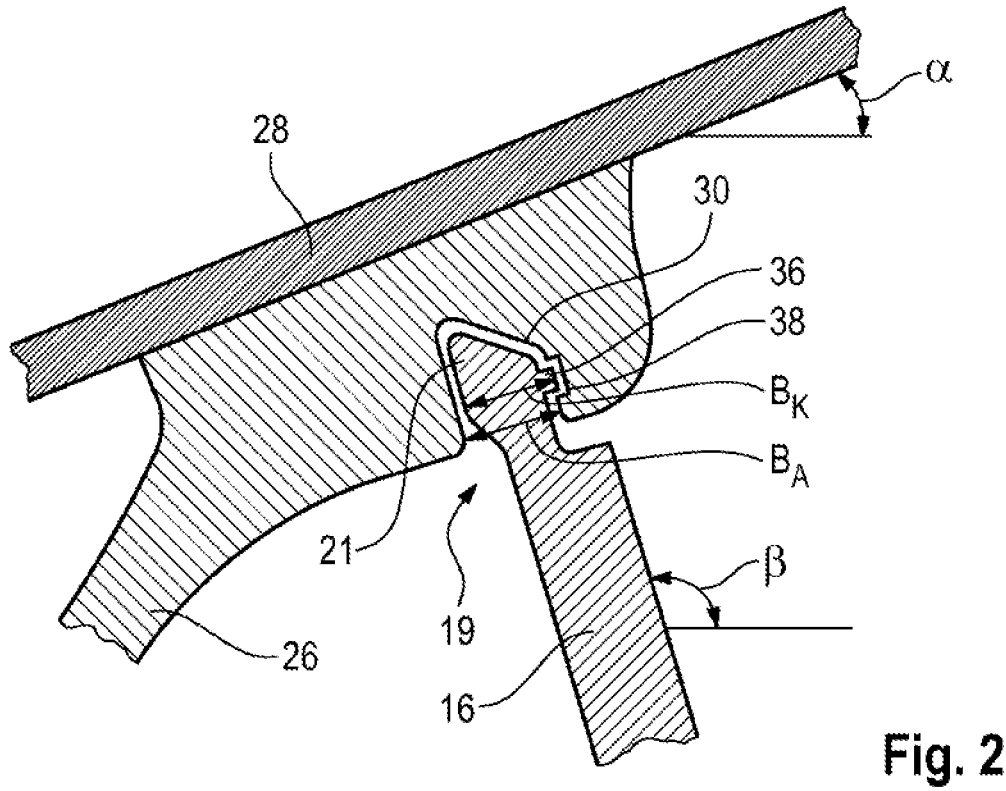
FIG. 2 is a view of the detail of the charging flap system according to FIG. 1.

The receptacle region 30 and the coupling member 21 in the intermediate position of the flaps 16, 28 are illustrated in detail in FIG. 2.

The outermost end of the coupling member 21 here has a wedge shape so as to guarantee easy sliding into the receptacle region 30. Furthermore, a deformable latching cam 36 is provided on the coupling member 21 so as to reinforce the form-fit between the two flaps 16, 28 and configure a type of jamming and/or latching.

For this purpose, the coupling member 21 in the region of the latching cam 36 has a somewhat greater width $B_K$ than a width $B_A$ of the receptacle region 30 in the region of an opening, for example.

A latching well 38 for receiving the latching cam 36 is disposed in the receptacle region 30.

In other words, the receptacle region 30 has an undercut.

The shape of the receptacle region 30 is (substantially) complementary to that of the coupling member 21.

The sequence of a charging procedure while using the intermediate position of the outer covering flap 28 shown in FIGS. 1 and 2 will be described hereunder.

A battery of the at least partially electrically operated motor vehicle, for example of a hybrid or electric vehicle, can be charged by way of the charging connector 12. To this end, the outer covering flap 28 is opened and pivoted to the open position thereof.

Thereafter, the inner charging flap 16 is opened so as to expose the charging connector 12.

Optionally, the inner charging flap 16 can be preloaded in the opening direction such that the inner charging flap 16 opens automatically upon opening the covering flap 28.

It can be provided that the inner charging flap 16 by opening the outer covering flap 28 is opened in a self-acting manner and, by virtue of the preload, transitions along the hinge arm 26 of the outer covering flap 28 to the open position thereof. The hinge arm 26 here serves as a type of guide.

In the charging position, the inner charging flap 16 by way of the free end 19 thereof bears on the hinge arm 26 of the outer covering flap 28.

A charging plug is plugged into the exposed charging connector 12 and the battery of the motor vehicle is thus charged.

The charging well 14 is completely exposed in the open position of the outer covering flap 28. In this position, solid or liquid substances can invade the charging well 14 and the hinge box 18 unimpeded. The invading substances can accumulate in the hinge box 18 and lead to the hinge arm 26 being blocked such that the outer covering flap 28 can no longer be closed.

Furthermore, the outer covering flap 28 in the open position projects from the vehicle body 24 so as to be (substantially) orthogonal and thereby extends far outward. In this position, there is the risk that vehicle users or pedestrians collide with the outer covering flap 28 and damage the outer covering flap 28.

In order to minimize or prevent the potential invasion of external substances and the risk of damage, the outer covering flap 28 is moved to the intermediate position.

For this purpose, the outer covering flap 28 is pivoted from the open position in the direction of the closed position thereof. The coupling member 21 disposed on the free end 19 of the inner charging flap 16 here slides along the hinge arm 26 into the receptacle region 30 of the outer covering flap 28.

As a result of further pressure on the outer covering flap 28 in the direction of the closed position, the latching cam 36 bearing on the opening of the receptacle region 30 is deformed until the width $B_K$ of the coupling member 21 is somewhat smaller than the width $B_A$ of the opening of the receptacle region 30. In other words, the latching cam 36 is compressed.

The coupling member 21 thereafter slides further into the receptacle region 30 until the latching cam 36 is received in the latching well 38 and, as a result thereof, the coupling member 21 latches in a form-fitting manner to the receptacle region 30.

As a result of the interaction of the latching cam 36 and the latching well 38, the outer covering flap 28 thus not only interlocks with the inner charging flap 16 but the two flaps 16, 28 are coupled to one another in a form-fitting manner.

Once the charging procedure has been completed, the form-fitting coupling of the two flaps 16, 28 is released in that the outer covering flap 28 is pushed or pulled, respectively, in the direction of the open position thereof until the latching cam 36—in a manner similar to the coupling procedure of the two flaps 16, 28—is deformed and the coupling member 21 can slide out of the receptacle region 30.

Subsequently, the inner charging flap 16 is pushed in to the closed position thereof, whereupon the outer covering flap 28 can be moved in to the closed position thereof unimpeded.

The invention claimed is:

1. A motor vehicle, comprising:
   a vehicle body component; and
   a charging flap system for the motor vehicle, the charging flap system comprising:
   a charging well arranged in the vehicle body component;
   a charging connector arranged in the charging well, for electrically charging the motor vehicle;
   a pivotable, outer covering flap which covers the charging well in a closed position and uncovers the charging well in an open position; and
   a pivotable, inner charging flap which uncovers the charging connector in a charging position,
   wherein the inner charging flap and the outer covering flap interact such that the outer covering flap and the inner charging flap are coupled to one another in a form-fitting manner in an intermediate position between the open position and the closed position.

2. The motor vehicle according to claim 1, wherein
   the outer covering flap and the inner charging flap are coupled to one another in the form-fitting manner only in the intermediate position between the open position and the closed position.

3. The motor vehicle according to claim 1, wherein
   the form-fitting manner of the coupling is an interlocking coupling.

4. A charging flap system for an at least partially electrically operated motor vehicle, comprising:
   a charging connector arranged in a charging well, for electrically charging the motor vehicle;
   a pivotable, outer covering flap which covers the charging well in a closed position and uncovers the charging well in an open position; and
   a pivotable, inner charging flap which uncovers the charging connector in a charging position,
   wherein the inner charging flap and the outer covering flap interact such that the outer covering flap and the inner charging flap are coupled to one another in a form-fitting manner in an intermediate position between the open position and the closed position.

5. The charging flap system according to claim 4, wherein
   the outer covering flap comprises a hinge arm by way of which the outer covering flap is attached to the vehicle; and
   the hinge arm includes the receptacle region in which at least part of the inner charging flap is receivable.

6. The charging flap system according to claim 4, wherein
- the outer covering flap in the intermediate position is held at an angle (α) of at least 20° to at most 60° in relation to a plane in which the charging connector is disposed, and/or
- the inner charging flap in the intermediate position of the outer covering flap is held at an angle (β) of at least 90° to at most 180° in relation to a plane in which the charging connector is disposed.

7. The charging flap system according to claim 4, wherein
- the outer covering flap in the intermediate position is held at an angle (α) of at least 30° to at most 40° in relation to a plane in which the charging connector is disposed.

8. The charging flap system according to claim 4, wherein
- the inner charging flap in the intermediate position is held at an angle (β) of at least 90° to at most 120° in relation to a plane in which the charging connector is disposed.

9. The charging flap system according to claim 4, wherein
- the form-fitting coupling of the outer covering flap and the inner charging flap is releasable by a pivoting movement of the outer covering flap in the direction of the open position.

10. The charging flap system according to claim 4, wherein
- the inner charging flap and/or the outer covering flap is preloaded to the respective charging or open position, respectively.

11. The charging flap system according to claim 4, wherein
- the outer covering flap and the inner charging flap are coupled to one another in the form-fitting manner only in the intermediate position between the open position and the closed position.

12. The charging flap system according to claim 4, wherein
- the form-fitting manner of the coupling is an interlocking coupling.

13. The charging flap system according to claim 4, wherein
- the form-fitting manner of the coupling comprises a press-fit.

14. The charging flap system according to claim 4, wherein
- the outer covering flap has a receptacle region in which at least part of the inner charging flap is receivable.

15. The charging flap system according to claim 14, wherein
- the receptacle region comprises a concavity-shaped receptacle.

16. The charging flap system according to claim 4, wherein
- a coupling member, by way of which the inner charging flap in the intermediate position is coupled in the form-fitting manner to the outer covering flap, is provided on the inner charging flap.

17. The charging flap system according to claim 16, wherein
- a latching cam is provided on the coupling member.

18. The charging flap system according to claim 16, wherein
- the coupling member is provided on a free end of the inner charging flap.

19. The charging flap system according to claim 18, wherein
- the free end, in terms of the inner charging flap, is opposite a pivot axis of the inner charging flap.

* * * * *